US009659362B2

(12) United States Patent
Klimovski et al.

(10) Patent No.: US 9,659,362 B2
(45) Date of Patent: May 23, 2017

(54) METHODS AND SYSTEMS FOR GENERATING A FINGERPRINT FOR VERIFICATION OF A REFERENCE OBJECT

(71) Applicant: The Boeing Company, Chicago, IL (US)

(72) Inventors: Andrew Klimovski, Melbourne (AU); Martin A. Szarski, Melbourne (AU)

(73) Assignee: The Boeing Company, Chicago, IL (US)

( * ) Notice: Subject to any disclaimer, the term of this patent is extended or adjusted under 35 U.S.C. 154(b) by 42 days.

(21) Appl. No.: 14/824,490

(22) Filed: Aug. 12, 2015

(65) Prior Publication Data
US 2017/0046824 A1 Feb. 16, 2017

(51) Int. Cl.
G06T 7/00 (2017.01)
G06K 9/32 (2006.01)
(Continued)

(52) U.S. Cl.
CPC ............ *G06T 7/001* (2013.01); *G06K 9/3241* (2013.01); *G06K 9/6202* (2013.01); *G08B 21/18* (2013.01);
(Continued)

(58) Field of Classification Search
CPC .... G06K 9/00577; G06K 9/46; G06K 9/4661; G06K 2009/4666; G06K 9/6201;
(Continued)

(56) References Cited

U.S. PATENT DOCUMENTS 5,521,984 A * 5/1996 Denenberg et al. .......... 382/209
6,711,293 B1 3/2004 Lowe ............................ 382/219
(Continued)

FOREIGN PATENT DOCUMENTS

WO WO 2005/109315 A2 11/2005

OTHER PUBLICATIONS

Smith et al., "Automated Analysis and Advanced Defect Characterisation from Ultrasound Scans of Composites", Insight, vol. 51, No. 2, Feb. 2, 2009, pp. 82-87.
(Continued)

Primary Examiner — Andrew W Johns
(74) Attorney, Agent, or Firm — McDonnell Boehnen Hulbert & Berghoff LLP

(57) ABSTRACT

Disclosed herein are methods and systems for generating a fingerprint for verification of a reference object, such as a layer or ply during a composite laminate layup procedure. An exemplary method includes the steps of generating at least one reference image of a reference object; removing lighting effects from the at least one reference image to create at least one processed image; generating a reference fingerprint for the reference object based on the at least one processed image; generating at least one candidate image of a candidate object; generating a candidate fingerprint for the candidate object based on the at least one candidate image; and comparing the candidate fingerprint and the reference fingerprint to determine a correlation. An alert is generated based on the comparison. The alert is indicative that the correlation between the candidate fingerprint and the reference fingerprint exists.

19 Claims, 3 Drawing Sheets

(51) Int. Cl.
 *G06K 9/62* (2006.01)
 *H04N 5/225* (2006.01)
 *G08B 21/18* (2006.01)
(52) U.S. Cl.
 CPC . *H04N 5/2256* (2013.01); *G06T 2207/10016* (2013.01); *G06T 2207/30164* (2013.01)
(58) Field of Classification Search
 CPC .. G06K 9/6202; G06K 9/6217; G06K 9/6255; G06T 5/007; G06T 5/008; G06T 5/50; G06T 7/001; G06T 2207/30164
 See application file for complete search history.

(56) References Cited

U.S. PATENT DOCUMENTS

| | | | |
|---|---|---|---|
| 2007/0132759 A1 | 6/2007 | Mallick et al. | 345/426 |
| 2012/0243797 A1* | 9/2012 | Di Venuto Dayer et al. | 382/218 |

OTHER PUBLICATIONS

Extended European Search Report prepared by the European Patent Office in application No. EP 16 17 0112, dated Dec. 21, 2016.

* cited by examiner

METHODS AND SYSTEMS FOR GENERATING A FINGERPRINT FOR VERIFICATION OF A REFERENCE OBJECT

FIELD

Embodiments of the present disclosure relate generally to object recognition. More particularly, embodiments of the present disclosure relate to methods and systems for generating a fingerprint for verification of a reference object, such as a composite laminate layer or ply that is laid up during composite laminate manufacturing.

BACKGROUND

Various different methods may be used in a production or manufacturing environment in order to properly identify objects. Traditionally, an object may be tagged with a unique physical tag or label that identifies the object. In some instances, the physical tag may be optically read in order to verify that an object being interrogated is the desired object.

SUMMARY

In an arrangement, a method for generating a fingerprint for verification of a reference object is disclosed. The method includes generating at least one reference image of a reference object, removing lighting effects from the at least one reference image to create at least one processed image, generating a reference fingerprint for the reference object based on the at least one processed image, generating at least one candidate image of a candidate object, generating a candidate fingerprint for the candidate object based on the at least one candidate image, comparing the candidate fingerprint and the reference fingerprint to determine whether a correlation exists between the candidate fingerprint and the reference fingerprint, and generating an alert based on the comparison of the candidate fingerprint and the reference fingerprint. The alert is indicative that the correlation between the candidate fingerprint and the reference fingerprint exists.

In one arrangement, the step of generating at least one reference image comprises the step of generating at least one reference image of a composite laminate ply.

In one arrangement, the step of generating at least one reference image comprises the step of generating at least one reference image of a surface of a composite laminate ply.

In one arrangement, the step of generating a reference fingerprint for the reference object based on the at least one reference image comprises the step of generating the reference fingerprint based on a surface of the reference object.

In one arrangement, the step of generating the alert further comprises the step of determining whether the reference object is a same object as the candidate object.

In one arrangement, the step of generating a candidate fingerprint further comprises the step of generating the candidate fingerprint based on a surface of the candidate object.

In one arrangement, the step of generating the alert comprises the step of determining whether a surface of the reference object is similar to a surface of the candidate object.

In one arrangement, the step of generating at least one reference object image comprises the step of generating a plurality of images of the reference object from a plurality of angles.

In one arrangement, the at least one image comprises a plurality of images and the step of removing lighting effects further comprises the steps of comparing the plurality of images to each other, generating a light-neutral image, and storing the light-neutral image.

In one arrangement, the method further comprises the steps of removing lighting effects from the at least one candidate image, creating at least one candidate image that is processed, and generating a candidate fingerprint for the candidate object based on the at least one candidate image that is processed.

In an arrangement, a system for generating a fingerprint for verification of a reference object is disclosed. The system comprising a least one detector configured to generate at least one reference image of a reference object and generate at least one candidate image of a candidate object. A signal processor is configured to remove lighting effects from the at least one reference image to create at least one processed image, generate a reference fingerprint for the reference object based on the at least one processed image, generate a candidate fingerprint for the candidate object based on the at least one candidate image, and compare the candidate fingerprint and the reference fingerprint to determine a correlation between the candidate fingerprint and the reference fingerprint, and generate an alert based on the comparison of the candidate fingerprint and the reference fingerprint. The alert is indicative that the correlation between the candidate fingerprint and the reference fingerprint exists.

In one arrangement, the system further comprises a first light source configured to illuminate the reference object, wherein the signal processor is further configured to remove lighting effects caused by the first light source.

In one arrangement, the system further comprises a second light source configured to illuminate the candidate object, wherein the signal processor is further configured to remove lighting effects caused by the second light source.

In one arrangement, the reference fingerprint is based on a surface of the reference object.

In one arrangement, the signal processor is configured to determine whether the reference object is the candidate object.

In one arrangement, the candidate fingerprint is based on a surface of the candidate object.

In one arrangement, the at least one detector is further configured with a plurality of lenses, the plurality of lenses cause the at least one detector to receive light reflected from the reference object at a plurality of angles.

In one arrangement, the plurality of lenses cause the at least one detector to record a representation of the light reflected from the reference object and associated with each lens of the plurality of lenses.

In an arrangement, a method includes configuring a signal processor to receive an output from a detector and store at least one reference image of a reference object, and at least one candidate image of a candidate object, remove lighting effects from the at least one reference image to create at least one processed image, generate a reference fingerprint for the reference object based on the at least one processed image, generate a candidate fingerprint for the candidate object based on the at least one candidate image, and compare the candidate fingerprint and the reference fingerprint to determine a correlation between the candidate fingerprint and the reference fingerprint.

In an arrangement, the method further comprises the steps of configuring the signal processor to generate an alert based on a comparison of the candidate fingerprint and the reference fingerprint. The alert is indicative that the correlation between the candidate fingerprint and the reference fingerprint exists.

In one arrangement, a method for generating a fingerprint for verification of a reference object is disclosed. The method includes generating at least one reference image of a reference object, generating at least one processed image from the at least one reference image, generating a reference fingerprint for the reference object based on the at least one processed image; generating at least one candidate image of a candidate object, generating a candidate fingerprint for the candidate object based on the at least one candidate image, comparing the candidate fingerprint and the reference fingerprint to determine whether a correlation exists between the candidate fingerprint and the reference fingerprint, and generating an alert based on the comparison of the candidate fingerprint and the reference fingerprint. The alert is indicative that the correlation between the candidate fingerprint and the reference fingerprint exists.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded a scope that is consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, cameras, lenses, detectors, electronic circuits, electronic devices, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, an optical camera. Embodiments of the disclosure, however, are not limited to such optical camera applications, and the techniques described herein may also be utilized in other applications. For example, but without limitation, embodiments may be applicable to infrared, ultraviolet, X-ray, or other types of cameras.

The following are examples and embodiments of the disclosure and are not limited to operating in accordance with these examples. Other embodiments may be utilized and structural changes may be made without departing from the scope of the example embodiments of the present disclosure.

Figure 1:
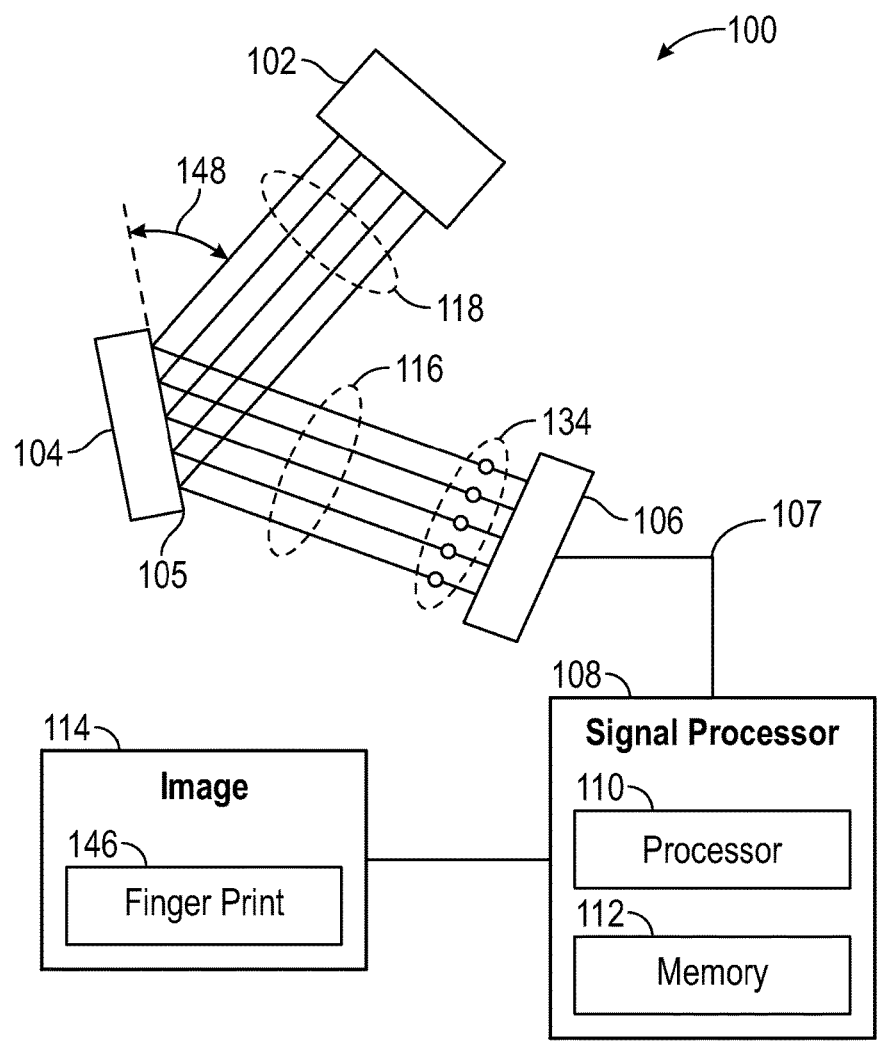
FIG. 1 is a diagrammatic representation of an example system for generating a fingerprint for verification of a reference object.

FIG. 1 is a diagrammatic representation of an example system 100 for generating a fingerprint 146 for verification of a reference object 104 according to an embodiment of the disclosure. In one exemplary arrangement, the reference object 104 may comprise a composite laminate layer or ply that has been laid up during composite laminate manufacturing, such as during a composite laminate layup procedure.

System 100 comprises at least one detector 106 and a signal processor 108. System 100 is configured for imaging a reference object 104. Light 118 generated by a light source 102 reflects off a surface 105 of the reference object 104. Reflected light 116 is reflected off the surface 105 of the reference object 104 and is received at the detector 106. In this illustrated arrangement, the reflected light 116 is received by the detector 106 after the reflected light 116 passes through a plurality of lenses 134

The light source 102 comprises, for example but without limitation, a laser, a filtered light source, another spectrally selective light source, an ambient light source, a fluorescent light source, and/or other similar light sources. In one arrangement, the light source 102 emits a plurality of spectral wavelengths, such as spectral colors, as light 118. The spectral wavelengths may reside in, for example but without limitation, the ranges of visible light, infrared light, ultra violet light, X-rays, or spectrums of electromagnetic energy (light). The spectral wavelengths may each comprise, for example but without limitation, individual bands of wavelength, a specific wavelength, a group of wavelengths, a range of wavelengths, or other distinguishable wavelengths.

In one exemplary arrangement, the light source 102 generates white light as light 118 that impinges upon the surface 105 of the reference object 104. White light generally includes a plurality of different spectral wavelengths that combine to appear to the human eye as white. As illustrated, the light 118 emitted from the light source 102 is incident upon the surface 105 of the reference object 104 at a plurality of incident angles 148. Although the light source 102 is shown as a discrete component, the presently disclosed systems and methods can function in a similar manner with ambient light. For example, lighting conditions within a manufacturing environment can act as the light source 102 and therefore provide the light 118 that is incident upon the surface 105 of the reference object 104.

The reference object 104 reflects the incident light 118 from the light source 102 as reflected light 116. In FIG. 1, the light 118 is incident on the surface 105 of the reference object 104 at a plurality of incident angles 148 and is directed towards the detector 106 as reflected light 116. As noted previously, the reference object 104 is a material that is to be imaged. In one exemplary arrangement, the reference object 104 comprises a carbon fiber based layer or ply, such as a sheet of carbon fiber used in a composite laminate manufacturing process. In such a manufacturing process, light 118 emitted by the light source 102 will be incident on a surface of the ply and therefore will be reflected towards the detector 106. The reflected light 116 reflected from the surface of the ply will therefore be representative of a contour, a profile, and/or a pattern of the surface of the ply.

The detector 106 receives the reflected light 116 reflected from the surface 105 of the reference object 104 (e.g., the layer or ply). In one arrangement, the detector 106 comprises a charge-coupled device (CCD), such as a CCD of a digital camera. Other suitable detectors may also be used. The detector 106 receives the reflected light 116 after the reflected light 116 propagates through the plurality of lenses 134. The plurality of lenses 134 cause the detector 106 to receive the reflected light 116 from a plurality of different angles. Therefore, the plurality of lenses 134 cause the detector 106 to detect light from a plurality of different angles after the light 118 has reflected from the surface 105 of the reference object 104. For example, and as shown in FIG. 1, the five lenses of the plurality of lenses 134 each receive the reflected light 116 with each of the five lenses corresponding to a different angle of reflection. Therefore, the detector 106 detects the reflected light 116 and records a representation of the reflected light 116 associated with each lens of the plurality of lenses 134. In this illustrated arrangement, the detector 106 is configured to receive the reflected light 116 corresponding to several different views (e.g., the five lenses providing five different views) of the reference object 104, with each view of the five different views received from a slightly different angle. In one exemplary arrangement, the detector 106 comprises a plurality of sensors. In one preferred arrangement, the plurality of sensors are arranged within a sensor array, such as a sensor array of a camera.

The signal processor 108 receives an output 107 from the detector 106. The output 107 is representative of the reflected light 116 that is detected by the detector 106. The signal processor 108 is configured to perform several different functions related to the disclosed methods and systems for generating a fingerprint for verification of a reference object 104. The signal processor 108 receives the output 107 from the detector 106 and stores an image 144 based at least in part on the output 107 that the signal processor 108 receives from the detector 106. The image 144 that is stored may take several forms. In one arrangement, the image 144 includes certain raw data that is collected by the detector 106. When the image 144 comprises raw data that is collected by the detector 106, the image 144 includes a plurality of views of the surface 105 of the reference object 104. In other exemplary arrangements, the image 144 that is stored comprises a processed image that comprises at least a single view of the surface 105 of the reference object 104.

As used in the context of the present disclosure, the term "image" is not intended to exclude embodiments or examples in which data representing an image is generated or produced but a viewable image is not generated or displayed. Consequently, as used in the present disclosure, the term "image" refers to both a viewable image as well as data representing a viewable image. As just one example, some embodiments may generate at least one viewable image while the processor of the system(s) may operate on the data representing a viewable image.

In one arrangement where the image 144 comprises a single view of the surface 105 of the reference object 104, the signal processor 108 is configured to analyze the various views of the reference object 104 so as to determine a single image. In an alternative arrangement, where the image 144 comprises a single view of the surface 105 of the reference object 104, the signal processor 108 is configured to analyze the various views of the reference object 104 so as to determine a single image that has had lighting effects removed. For example, such lighting effects may comprise undesirable lighting effects, such as specularity and/or color distortions. Such lighting effects are undesirable when they have a tendency to cause a fingerprint to be generated with a low chance of repeatability. For example, specularity and color distortion can vary from scene (e.g., a work environment) to scene (e.g., another work environment) and cause the same object to appear differently based on when and how an image is generated. This variance is undesirable because it reduces an ability to properly determine when a reference object is actually present in the scene.

As an example, the signal processor 108 is configured to analyze the various views of the reference object 104 so as to determine a single image that has had specularity removed. In situations where specularity is removed, the signal processor 108 can be configured to remove specularity in various ways. In one example, the signal processor 108 removes specularity by analyzing the various views of the reference object 104 to determine a light-neutral version of the plurality of images. A light-neutral image may allow an object that is represented in the image to be compared to subsequently generated images of objects that had different lighting. For example, to determine a light-neutral version of a plurality of images, the signal processor 108 compares the various views of the reference object 104 and creates an image of a single view that has bright spots removed. Bright spots can occur where light experiences specular reflection rather than diffuse reflection. Specular reflection can be caused by light reflecting at the same angle as the incident angle. Specular reflection can cause difficulties in viewing and imaging the reference object 104 that is represented in the image 144.

In one preferred arrangement, the signal processor 108 is configured to generate a fingerprint 146 of the image 144 (where lighting effects have or have not been removed). As one example, the fingerprint 146 comprises a set of data that represents the image 144 in a smaller file size. In one example, the fingerprint 146 of the image 144 comprises a set of data that is unique to the reference object 104 that is represented in the image 144. Therefore, if a second image is generated after a first image is generated, the fingerprint of the second generated image can be compared to the initial fingerprint 146 so as to determine if the same reference object 104 was used to create the initial fingerprint 146.

In another example, the fingerprint 146 of the image 144 comprises a set of data that is unique to a pattern that is provided on the surface 105 of reference object 104 that is represented in the image 144. Therefore, if a candidate image (e.g., a second image) is generated after the image 144, a fingerprint of the candidate image can be compared to the fingerprint 146 to determine if the object represented in the candidate image has the same surface pattern as the surface pattern that originally created the fingerprint 146. As just one example, the same surface pattern is oftentimes useful to determine if two composite laminate plies have a similar weave pattern and/or a similar fiber size. Further, the image 144 and the candidate image may be produced with different light sources. As just one example, the image 144 may be produced by utilizing a laser as the light source 102 to illuminate the reference object 104 whereas the candidate image may be produced by utilizing ambient light as a light source 102 to illuminate the reference object 104.

Preferably, the signal processor 108 comprises a processor module 110 and a memory module 112. In one preferred arrangement, the processor module 110 of the signal processor 108 is implemented, or realized, with a general purpose processor, a content addressable memory, a digital signal processor, an application specific integrated circuit, a field programmable gate array, a suitable programmable logic device, discrete gate or transistor logic, discrete hardware components, or any combination thereof, designed to perform the functions described herein. In this manner, in one arrangement, a processor is realized as a microprocessor, a controller, a microcontroller, a state machine, or the like. Alternatively, the processor is implemented as a combination of computing devices comprising hardware and/or software, e.g., a combination of a digital signal processor and a microprocessor, a plurality of microprocessors, one or more microprocessors in conjunction with a digital signal processor core, or any other such configuration. Preferably, the processor module 110 is configured to perform some or all of the functions disclosed herein, such as the functions associated with the signal processor 108.

Preferably, the memory module 112 of the signal processor 108 comprises a data storage area comprising memory that is formatted to support the operation of the system 100. The memory module 112 is configured to store, maintain, and provide data as needed to support the functionality of the system 100. As just one example, but without limitation, the memory module 112 stores an intensity of the reflected light 116, the fingerprint 146, the image 144, and/or other image related data.

In one preferred arrangement, the memory module 112 comprises a non-volatile storage device (non-volatile semiconductor memory, hard disk device, optical disk device, and the like), a random access storage device (for example, SRAM, DRAM), or other similar storage mediums.

In one preferred arrangement, the memory module 112 is coupled to the processor module 110. The memory module 112 is configured to store, for example but without limitation, a database, a computer program that is executed by the processor module 110, an operating system, an application program, tentative data used in executing a program, or other application. Additionally, in one arrangement, the memory module 112 represents a dynamically updating database containing a table for updating the database, and the like.

The memory module 112 is coupled to the processor module 110 such that the processor module 110 can read information from and write information to the memory module 112. In one exemplary arrangement, the processor module 110 accesses the memory module 112 to retrieve and/or store the received light 116, the fingerprint 146, the image 144, and/or other data.

In one arrangement, the processor module 110 and the memory module 112 reside in respective application specific integrated circuits (ASICs) or other programmable devices. The memory module 112 can be integrated into the processor module 110. In one arrangement, the memory module 112 comprises a cache memory for storing temporary variables or other intermediate information during execution of instructions to be executed by the processor module 110.

Figure 2:
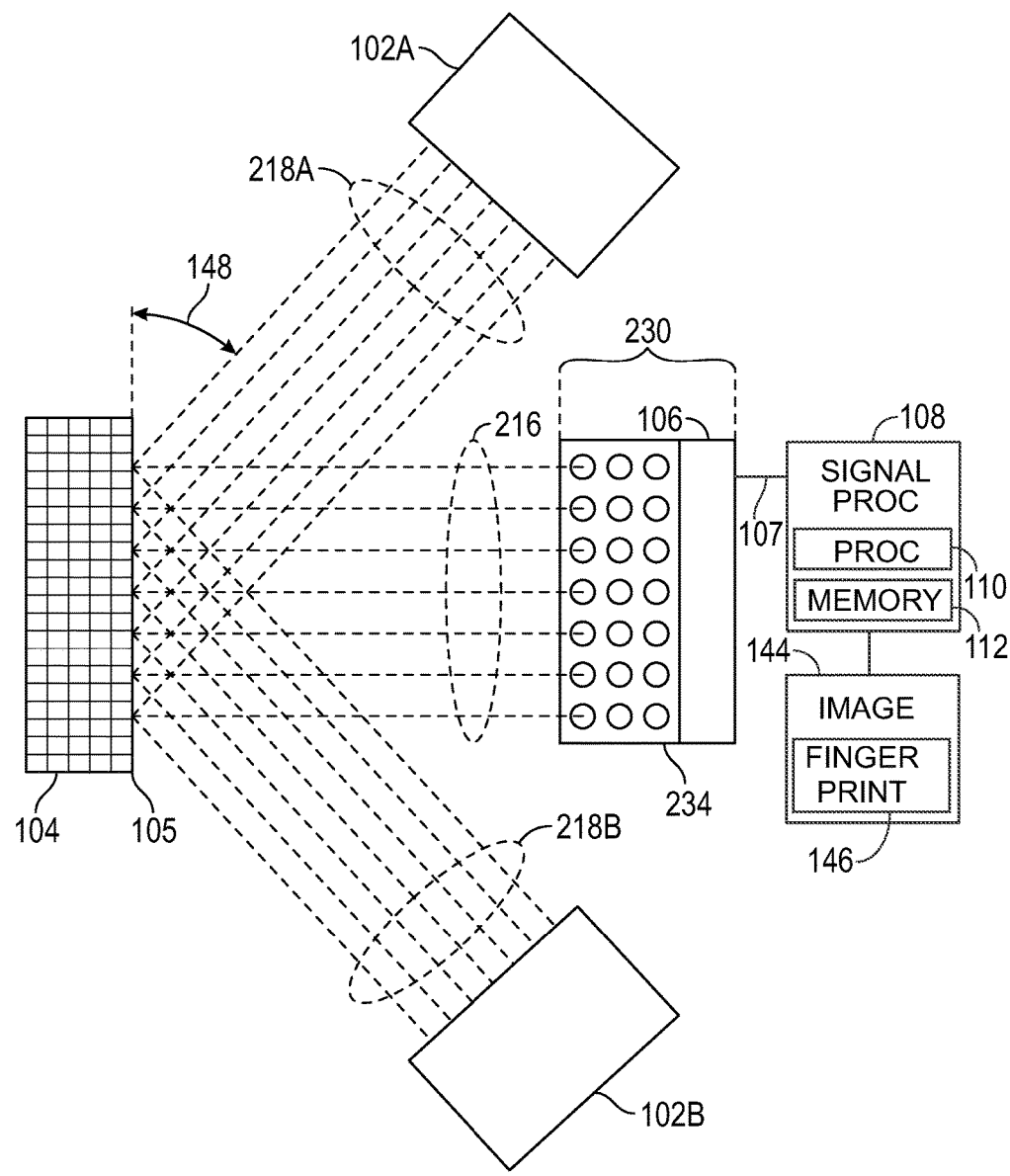
FIG. 2 is a diagrammatic representation of another system for generating a fingerprint for verification of a reference object.

FIG. 2 is a diagrammatic representation of another system 200 for generating a fingerprint (such as fingerprint 146 illustrated in FIG. 1) for verification of a reference object 104. Specifically, FIG. 2 is an illustration of an exemplary light field camera system 200 comprising a light field camera 230 (i.e., also known as a plenoptic camera). System 200 is similar to system 100 illustrated in FIG. 1 in that both systems 100, 200 utilize similar light sources 102, 102A, 102B, both utilize a plurality of lenses 134, 234, both utilize a similar detector 106, and both operate to illuminate a surface 105 of a reference object 104. In addition, both systems 100, 200 include a signal processor 108 that operates to receive an output 107 from a detector 106, generate an image 144, and generate a fingerprint 146. One difference between these two systems 100, 200 is that system 200 of FIG. 2 utilizes two light sources 102A and 102B, although these two light sources 102A, 102B operate in a similar manner as the light source 102 of system 100. Another difference between these two systems 100, 200 is that the plurality of lenses 234 in system 200 are arranged in a two dimensional array.

The light field camera 230 illustrated in FIG. 2 is utilized to obtain an image of the reference object 104 according to an exemplary embodiment. As used herein, the light field camera 230 is a type of camera that produces an image based on the intensity of the light received by the camera. In addition, the light field camera 230 collects information about the angle at which light enters the light field camera 230. In one exemplary arrangement, light field camera 230 is configured with a plurality of lenses 234. Each lens within the plurality of lenses 234 is configured to focus light onto a detector 106 that is preferably contained within the light field camera 230. In this illustrated arrangement, each lens of the plurality of lenses 234 focuses light onto the detector 106 based on the light being reflected from the surface 105 of the reference object 104 at a slightly different angle. Therefore, the detector 106 receives image data related to a plurality of different views of the reference object 104. For example, in one preferred arrangement, the light field camera system 200 is used to generate an image of reference object 104 comprising a composite laminate layer or ply that is used or laid up during composite laminate layup.

In the embodiment shown in FIG. 2, two light sources are utilized 102A and 102B to illuminate the reference object 104. Specifically, two light sources are utilized 102A and 102B to illuminate a surface 105 of the reference object 104. As noted, light sources 102A and 102B function in a similar manner as light source 102 of the system 100 illustrated in FIG. 1. These two light sources 102A and 102B of system 200 (FIG. 2) are positioned to cause light 218 to be incident on the surface 105 of the reference object 104 at a plurality of respective incident angles 148. Positioning the light sources 102A and 102B at the respective incident angles 148 allows for the surface 105 of the reference object 104 to be evenly illuminated.

Similar to the discussion with respect to the system 100 illustrated in FIG. 1, the light sources 102A and 102B in system 200 are illustrated as discrete components. However, in an alternative arrangement, either the first light source 102A or the second light source 102B (or both) may comprise ambient light. For example, there may be more than one source of ambient light, such as sun light or room lighting, that provide light 218A,B that is incident onto the surface 105 of the reference object 104. Light sources 102A and 102B provide incident light 218 A,B, respectively, that is reflected from the surface 105 of the reference object 104. This incident light 218A,B is then reflected as reflected light 216. This reflected light 216 is received by a plurality of lenses 234 of the light field camera 230. Each lens of the plurality of lenses 234 is configured to focus the reflected light 216 on to a detector 106 of the light field camera 230. Similar to the system 100 described with respect to FIG. 1, in one preferred arrangement, the detector 106 comprises a sensor array comprising a plurality of sensors.

The light 218A,B that is incident onto the surface 105 of the reference object 104 is incident at a plurality of incident angles 148 and reflected as reflected light 216 towards the camera 230. Each lens of the plurality of lenses 234 is configured to receive the reflected light 216 and each lens focuses the reflected light 216 onto the detector 106. Because each lens of the plurality of lenses 234 receives the reflected light 216 at a different angle of reflection, the reflected light 216 will advantageously represent a different view of the surface 105 of the reference object 104. Therefore, the detector 106 collects data of a pattern of the reference object 104. Because the detector 106 receives the reflected light 216 from a plurality of different angles, in one arrangement, lighting effects (such as specularity and/or color distortions) may be removed based on an analysis of the various images generated from the plurality of different angles. In yet an alternative arrangement, no lighting effects are removed after the detector 106 receives the reflected light 216 from a plurality of different angles.

Unlike the plurality of lenses 134 illustrated in FIG. 1, the plurality of lenses 234 illustrated in FIG. 2 are arranged as a two-dimensional array. Preferably, the two-dimensional array of the plurality of lenses 234 causes the detector 106 to collect an array of images based on the array of the plurality of lenses 234. As noted herein, the system 200 illustrated in FIG. 2 is coupled to a signal processor 108, similar to the signal processor 108 described herein with respect to FIG. 1.

Figure 3:
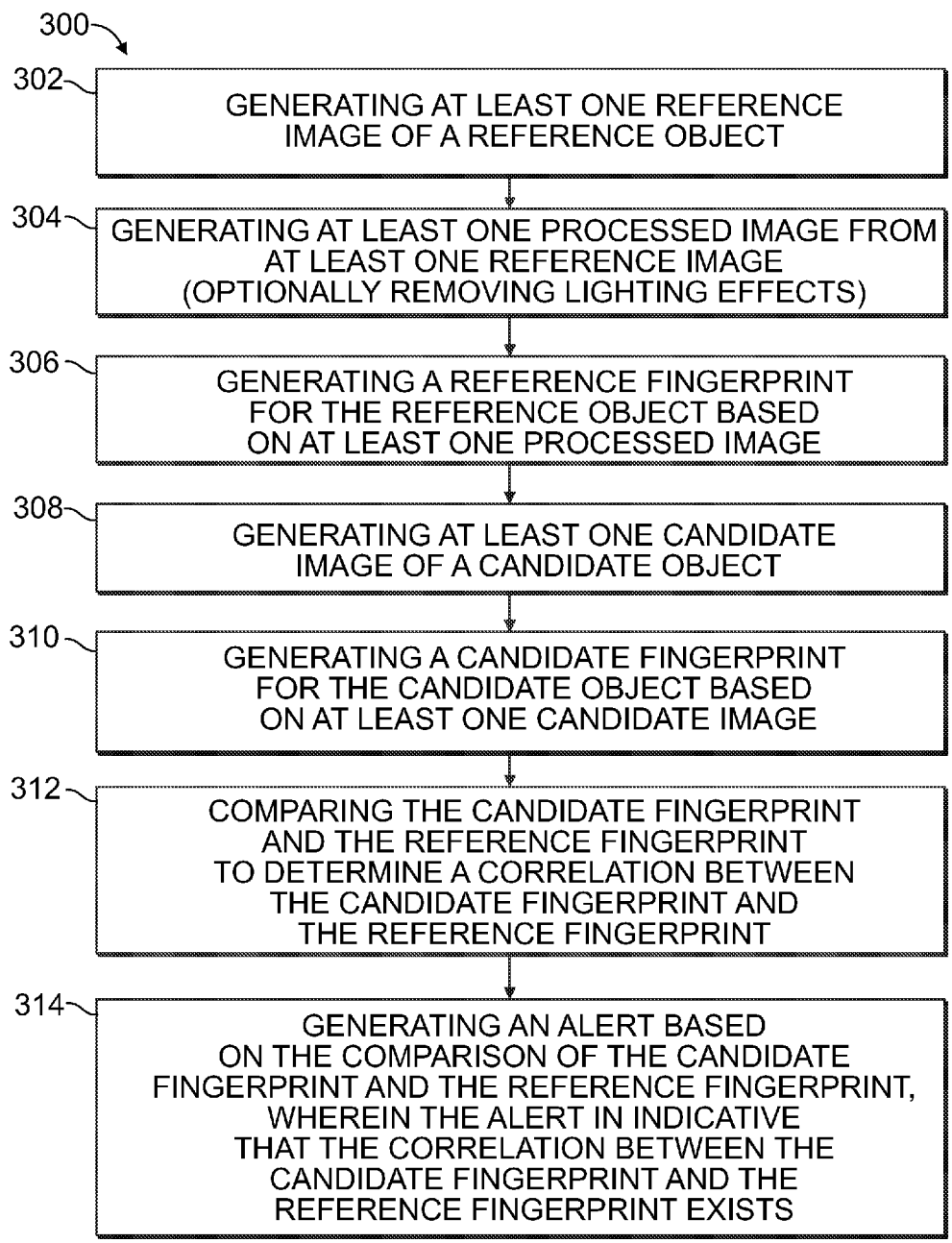
FIG. 3 is a flowchart of a method for generating a fingerprint for verification of a reference object.

FIG. 3 is a flowchart of an exemplary method for generating a fingerprint for verification of a reference object 104 (shown in FIGS. 1 and 2) according to an embodiment of the disclosure. The various tasks performed in connection with method 300 may be performed mechanically, by software, hardware, firmware, computer-readable software, computer readable storage medium, or any combination thereof.

For illustrative purposes, the following description of method 300 refers to elements mentioned herein with reference to the system 100 illustrated in FIG. 1 and the system 200 illustrated in FIG. 2. In one arrangement, portions of the method 300 are performed by different elements of the system 100 and the system 200 such as: the light sources 102, 102A or B, the reference object 104, the detector 106, the signal processor 108, the plurality of lenses 134, 234, and the light field camera 230. It should be appreciated that, in one arrangement, the method 300 includes any number of additional or alternative tasks. In addition, the tasks shown in FIG. 3 need not be performed in the illustrated order. Moreover, the method 300 can be incorporated into a more comprehensive procedure or process having additional functionality not described in detail herein.

The method 300 is applicable to many different applications, including manufacturing applications. In some situations, it is not be practical to apply a physical tag or label to an object. The method 300 uses optical techniques and optical recognition to avoid physically labeling various objects. In one example, producing at least one reference image of a reference object allows a fingerprint to be generated. This fingerprint is used to later verify that the object is the same object that was previously imaged, as the fingerprint is unique to a specific object. If the fingerprints do not match, it may be determined that a subsequently imaged object is different than the initially imaged object. This example may be useful in a manufacturing context to properly identify a specific type of composite laminate layer or ply for use in composite laminate manufacturing. In one exemplary arrangement, a first fingerprint is generated for such a layer or ply that is unique to that specific layer or ply of carbon fiber. Then, a second fingerprint is generated to verify that the layer or ply of carbon fiber is the same layer or ply from the earlier manufacturing activity. Advantageously, this verification can take place without having to physically add a tag or label to the layer or ply.

In a different application, it is not necessary for the objects to be exactly the same. Rather, it may be desirable for the objects to be substantially similar. In such an application, a fingerprint is generated that is unique for the type of object, but not necessarily unique for the specific object. Therefore, a candidate fingerprint (e.g., a second or subsequent fingerprint) is utilized to determine if the object that was used to create the candidate fingerprint is substantially similar to the object that was originally used to create the reference fingerprint (e.g., a first or initial fingerprint). The determination of a substantial similarity between two or more fingerprints may be useful in a composite laminate manufacturing process that uses carbon fiber layer or ply. For example, an initial fingerprint may be generated for a first ply of carbon fiber that is based on a surface pattern of the layer or ply. In a later process, a second fingerprint may be generated to verify that a second layer or ply has a surface pattern that is the same as the initial fingerprint from the earlier step of the manufacturing process involving the first ply. This can be accomplished without having to physically add a tag or label to the layer or ply. The same surface pattern may be useful to determine if the first and second layers or plies possess a similar weave pattern and/or a similar fiber size. In one example, comparing two or more fingerprints can help to ensure that the correct type of carbon fiber layer or ply is properly laid up in composite laminate manufacturing processes.

Method 300 begins at step 302 by generating at least one reference image of a reference object. In one arrangement, the reference image is generated by a system 100 and in a similar manner as described with respect to image 144 of FIG. 1. Alternatively, the reference image is generated by a light field camera system 200 as illustrated and discussed with reference to FIG. 2. In one arrangement, step 302 is performed during a manufacturing process that verifies that an object (e.g., a layer or ply used for a composite laminate layup) is indeed the correct object (e.g., the correct layer or ply for the desired layup procedure). Step 302 can also be performed during a manufacturing process that verifies that one carbon fiber part (e.g., a reference object) is the same carbon fiber part that was previously imaged to assemble the carbon fiber part into an assembly of carbon fiber parts. For example, in a composite lamination process, a layer or ply of a composite laminate is imaged after (or before) a layup process in order to verify that the correct layer or ply is used during a specific manufacturing process.

The reference object, such as a layer or ply or part of carbon fiber, is illuminated before image data is collected and the at least one reference image is generated. Preferably, the illumination is provided by ambient light, or a light source 102, 102A, 102B as part of the systems 100, 200 as described herein.

In one preferred method, the reference image data is collected at step 302 by utilizing a detector, such as of a light field camera 230 as shown in FIG. 2, and, optionally, the reference image is produced from the reference image data using the signal processor 108. Alternatively, the reference image data is collected at step 302 by utilizing a detector, such as the detector 106 of FIG. 1. As noted, a light field camera 230 is a type of camera that produces an image based on both the intensity of the light received by the camera, but also obtains information about the angle at which the light enters the camera 230. In one example, the light field camera 230 is configured with a plurality of lenses 234. Each lens of the plurality of lenses 234 focuses the reflected light 216 onto a detector 106 of the light field camera 230. However, each lens of the plurality of lenses 234 focuses the reflected light 216 onto the detector 106 based on the reflected light 216 being reflected from the surface 105 of the reference object 104 at a slightly different angle. As such, the detector 106 collects reference image data related to a plurality of different views of the reference object 104.

In one arrangement, at step 302, the method 300 generates more than one reference image. For example, the one or more reference images can each represent a specific region of the various views of the image generated at step 302. In another example, the one or more reference images are generated based on different averages of the various views of the image generated at step 302. In one arrangement, different averages are used to create the one or more reference images in order to make a subsequent fingerprinting of step 306 more robust and more likely to create a fingerprint 146 that is unique.

Method 300 continues at step 304 by generating at least one processed image from the at least one reference image generated at step 302. As just one example, at step 304, the at least one processed image may be generated by removing lighting effects from the at least one reference image. For example, such lighting effects could include specularity. In one arrangement, a signal processor 108 analyzes the various views of the image produced at step 302 to generate a single processed image. In an alternative arrangement, a signal processor 108 analyzes the various views of the image produced at step 302 to generate a single processed image that has lighting effects (e.g., specularity) removed. As previously discussed, the signal processor 108 is preferably configured to remove specularity using various methods. In one example, the signal processor 108 creates the processed image by removing specularity through analyzing the various views of the reference object 104 to determine a light-neutral version of the plurality of images, which is the processed image. To determine a light-neutral image, the signal processor 108 compares the various views of the reference object 104 and creates a processed image of a single view that has bright spots removed. Bright spots can occur where light experiences specular reflections rather than diffuse reflections. Specular reflections are caused by light reflecting at the same angle as the incident angle. Specular reflections may cause difficulties in viewing the object represented by the image.

In some examples, specularity is removed based on a statistical analysis of the various views of the reference image produced at step 302. For example, because specularity causes bright spots in an image, the plurality of various views of the reference image may be compared to one other to remove specularity. As part of the comparison, bright spots may be removed from a generated reference image by determining if a given feature of a produced reference image is statistically similar to a similar feature in other produced reference images. If the similar feature is not present among the various generated reference images, then this feature is removed. In another example, the various views of the image data collected at step 302 may be averaged together to form a processed image. However, as part of the averaging, portions of reference images that have statistical deviations from other reference images will be removed.

A light field camera 230 collects data for a number of different views of a reference object 104 at a given time. Some or all of the different views of the reference object 104 may contain specular reflections. When averaging the reference images to form the processed image, the specular reflections are identified as statistical deviations from the average of that respective point across the different views. In one preferred arrangement, these statistical deviations are removed before averaging. Once the specular reflection points are removed and the remaining portion of the reference images is averaged, a light-neutral image is created and stored as the processed image.

As noted herein, in one example, the signal processor 108 may or may not be utilized to remove specularity. Where the signal processor 108 is utilized to remove lighting effects such as specularity, it may do so by analyzing the various views of the reference object 104 to determine a light-neutral version of the plurality of reference images. A light-neutral image may allow a reference object that is represented in the reference image to be compared to subsequently generated images of reference objects that had different lighting. For example, to determine a light-neutral version of a plurality of images, the signal processor 108 compares the various views of the reference object 104 and creates an image of a single view that has bright spots removed. Bright spots can occur where light experiences specular reflection rather than diffuse reflection. Specular reflection can be caused by light reflecting at the same angle as the incident angle. Specular reflection can cause difficulties in viewing and imaging the reference object 104 that is represented in the image 144.

Method 300 continues at step 306 where the method 300 generates a reference fingerprint 146 for the reference object 104 based on the at least one processed image generated at step 304 (with or without the removal of lighting effects). As previously discussed, in one arrangement, the reference fingerprint 146 comprises a set of data that represents the processed image in a smaller file size. In one example, the reference fingerprint 146 of the processed image is a set of data that is unique to the reference object 104 that is represented in the image. Thus, if a candidate image or subsequent image is generated after the initial image is generated, a candidate fingerprint of the candidate image can be compared to the initial reference fingerprint 146 to determine if the same reference object was used to create the candidate fingerprint as well as the reference fingerprint 146 that was initially generated. In another example, the reference fingerprint 146 of the processed image comprises a set of data that is unique to a pattern provided on the surface 105 of reference object 104 that is represented in the image. Thus, if another reference image is generated subsequent to the first reference image, the fingerprint of the subsequently generated reference image can be compared to the initial fingerprint 146 to determine if the two objects have the same surface pattern. The same surface pattern is useful to determine if two layers or plies of carbon fiber have a similar weave pattern and/or a similar fiber size.

Method 300 continues at step 308 at which candidate image data is collected for generating at least one candidate image of a candidate object. In one arrangement, the candidate image data is collected by a light field camera 230 (as shown in FIG. 2), and in another arrangement, the candidate image data is collected using the plurality of lenses 134 and the detector 106 (as shown in FIG. 1). At step 308, the method 300 collects candidate image data in a similar manner as described above with respect to step 302 where the reference image data of the reference object 104 is collected. However, in one arrangement, the candidate image data is collected at a different time and under different lighting conditions as compared to step 302. For example, at step 302, the method 300 may collect reference image data at one stage in a manufacturing process and at step 308, the method 300 may collect candidate image data at a different stage in the manufacturing process. Additionally, at step 302, the method 300 may collect reference image data of a reference object that is illuminated by a first light source (e.g., a filtered light source) while at step 308, the method may collect candidate image data of a candidate object that is illuminated by a second light source (e.g., ambient light), wherein the second light source is different than the first light source.

Alternatively, step 308 of method 300 may include the step of collecting candidate image data with a camera other than the light field camera 230. In instances where step 308 collects candidate image data for a single image, it may not be possible to easily remove specularity in a manner similar to removing specularity at step 304. In this instance, at step 308, the process may simply store the single candidate image data that was collected.

In some examples, step 308 may optionally include processing that is similar to the optional processing that occurs at step 304 wherein specularity is removed from at least one reference image. Step 308 may or may not remove specularity from the at least one candidate image based on the type of image generated. For example, when step 308 collects data corresponding to a plurality of images of the candidate object, for example using the light field camera 230, specularity may be removed as described herein with respect to step 304. However, in some cases when step 308 collects data for producing a candidate image with a detector 106 (FIG. 1), the candidate image data may produce a single view of the candidate object and the specularity removal step 304 may not be applicable. So in this case, step 308 may or may not include a different specularity removal technique (as compared to step 304) for candidate images that include a single view of a reference object. These techniques may include removal of bright spots or cropping the stored candidate image so that the candidate image does not contain areas suspected of being specularity. Alternatively, at step 308, no removal techniques are utilized.

At step 310, the method 300 generates a candidate fingerprint for the candidate object based on the at least one candidate image generated at step 308. Preferably, the signal processor 108 (FIGS. 1 and 2) generates this candidate fingerprint. Step 310 generates a candidate fingerprint in a similar manner as the reference fingerprint is generated at step 306. However, step 310 generates the candidate fingerprint based on the at least one candidate image generated at step 308 rather than the at least one processed reference image generated at step 306. Alternatively, if step 308 includes the optional step of including processing that is similar to the processing that occurs at step 304, step 310 will generate the candidate fingerprint based on the at least one processed candidate image.

At step 312, the method 300 compares the candidate fingerprint and the reference fingerprint to determine a correlation between the candidate fingerprint and the reference fingerprint. By comparing the candidate fingerprint and reference fingerprints, a likelihood that these two fingerprints are similar is determined. For example, in one arrangement, the candidate fingerprint and reference fingerprint may each comprise multiple markers with a geometric relationship between the various markers. One way to determine a likelihood that the candidate and reference fingerprints are similar would be to count the number of markers that match and then check whether the fingerprints' geometric relationship between the markers is disturbed. If the proportion of given markers of the candidate and reference fingerprints are above a specific threshold, then the two fingerprints may be said to match. This specific threshold preferably comprises an adjustable threshold and is controllable so as to allow the method to trade off false positive versus false negative rates. In examples where the fingerprints are unique to a specific reference object, at step 312, the method 30 confirms whether or not the objects represented in the two images are the same object based on this comparison step. For example, in a composite laminate manufacturing process, it may be desirable to verify that a composite laminate layer or ply at one stage in the manufacturing process is the same type of layer or ply that is used during a different stage of the manufacturing process.

In examples where the fingerprints 146 are created based on the pattern on the surface 105 of the reference object 104, at step 312, the method 300 confirms whether or not the objects represented in the two images have the same surface pattern. One way to accomplish this confirmation is by way of the geometric relationship determination discussed herein. For example, in a manufacturing process, it will oftentimes be desirable to use a composite laminate layer or ply that has specific properties, such as a specific weave pattern and/or a specific weave dimension, at one stage in the manufacturing process. Thus, at step 312, the method 300 verifies that the composite laminate layer or ply possess the correct pattern and/or correct weave dimension, and is therefore the proper composite laminate layer or ply for that particular manufacturing process.

At step 314, the method 300 generates an alert based on the comparison of the candidate fingerprint and the reference fingerprint. Such an alert may be indicative that the correlation between the candidate fingerprint and the reference fingerprint exists. In some arrangements, the method at step 314 provides an alert when there is some correlation between the candidate and reference fingerprints, indicating that there exists a certain level of similarity between the reference object and the candidate object. In an alternative arrangement, the method 300 at step 314 may provide an alert when the fingerprints do not match, indicting a low level of similarity. For example, if similarity is determined on a geometric relationship as discussed herein, the two fingerprints may be said not to match if the proportion of given markers of the candidate and reference fingerprints are below a specific threshold. Therefore, the system 100, 200 will provide an indication that there is not a strong correlation between the candidate and reference fingerprints.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1 and 2 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 110 to cause the processor module 110 to perform specified operations. Such instructions, generally referred to as "computer program code" or "program code" (which may be grouped in the form of computer programs or other groupings), when executed, enable the system 100 and system 200 to perform the various functions described herein.

As used herein, unless expressly stated otherwise, "operable" means able to be used, fit or ready for use or service, usable for a specific purpose, and capable of performing a recited or desired function described herein. In relation to systems and devices, the term "operable" means that the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for generating a fingerprint for verification of a reference object, the method comprising the steps of:
    generating a plurality of images of the reference object from a plurality of angles;
    removing lighting effects from at least one reference image of the plurality of images to generate at least one processed image;
    generating a reference fingerprint for the reference object based on the at least one processed image;
    generating at least one candidate image of a candidate object;
    generating a candidate fingerprint for the candidate object based on the at least one candidate image;
    comparing the candidate fingerprint and the reference fingerprint to determine whether a correlation exists between the candidate fingerprint and the reference fingerprint; and
    generating an alert based on the comparison of the candidate fingerprint and the reference fingerprint, wherein the alert is indicative that the correlation between the candidate fingerprint and the reference fingerprint exists.

2. The method of claim 1, wherein the step of generating the plurality of images comprises the step of generating at least one reference image of a composite laminate ply.

3. The method of claim 1, wherein the step of generating the plurality of images comprises the step of generating at least one image of a surface of a composite laminate ply.

4. The method of claim 1, wherein the step of generating a reference fingerprint for the reference object based on the at least one processed image comprises the step of generating the reference fingerprint based on a surface of the reference object.

5. The method of claim 1, wherein the step of generating the alert further comprises the step of determining whether the reference object is a same object as the candidate object.

6. The method of claim 1, wherein the step of generating a candidate fingerprint further comprises the step of generating the candidate fingerprint based on a surface of the candidate object.

7. The method of claim 6, wherein the step of generating the alert comprises the step of determining whether a surface of the reference object is similar to the surface of the candidate object.

8. The method of claim 1, wherein the step of removing lighting effects further comprises the steps of:
    comparing the plurality of images to each other;
    generating a light-neutral image; and
    storing the light-neutral image as the at least one processed image.

9. The method of claim 1, further comprising the steps of:
    removing lighting effects from the at least one candidate image;

creating the at least one candidate image that is processed; and generating the candidate fingerprint for the candidate object based on the at least one candidate image that is processed.

10. A system for generating a fingerprint for verification of a reference object, the system comprising:
- at least one detector including a plurality of lenses to receive light reflected from the reference object at a plurality of different angles, the at least one detector configured to:
  - generate a plurality of images of the reference object from the plurality of different angles; and
  - generate at least one candidate image of a candidate object; and
- a signal processor configured to receive an output from the at least one detector, the signal processor configured to:
  - remove lighting effects from at least one reference image of the plurality of images to generate at least one processed image;
  - generate a reference fingerprint for the reference object based on the at least one processed image;
  - generate a candidate fingerprint for the candidate object based on the at least one candidate image;
  - compare the candidate fingerprint and the reference fingerprint to determine a correlation between the candidate fingerprint and the reference fingerprint; and
  - generate an alert based on the comparison of the candidate fingerprint and the reference fingerprint, wherein the alert is indicative that the correlation between the candidate fingerprint and the reference fingerprint exists.

11. The system of claim 10, further comprising a first light source configured to illuminate the reference object, wherein the signal processor is further configured to remove lighting effects caused by the first light source.

12. The system of claim 10, further comprising a second light source configured to illuminate the candidate object, wherein the signal processor is further configured to remove lighting effects caused by the second light source.

13. The system of claim 10, wherein the reference fingerprint is based on a surface of the reference object.

14. The system of claim 10, wherein the signal processor is further configured to determine whether the reference object is the candidate object.

15. The system of claim 10, wherein the candidate fingerprint is based on a surface of the candidate object.

16. The system of claim 10, wherein the plurality of lenses cause the at least one detector to record a representation of the light reflected from the reference object and associated with each lens of the plurality of lenses.

17. A method comprising:
configuring a signal processor to:
  receive an output from a detector and store:
    a plurality of images of a reference object from a plurality of angles, and
    at least one candidate image of a candidate object;
  remove lighting effects from at least one reference image of the plurality of images to generate at least one processed image;
  generate a reference fingerprint for the reference object based on the at least one processed image;
  generate a candidate fingerprint for the candidate object based on the at least one candidate image; and
  compare the candidate fingerprint and the reference fingerprint to determine a correlation between the candidate fingerprint and the reference fingerprint.

18. The method of claim 17 further comprising configuring the signal processor to generate an alert based on a comparison of the candidate fingerprint and the reference fingerprint, wherein the alert is indicative that the correlation between the candidate fingerprint and the reference fingerprint exists.

19. A method for generating a fingerprint for verification of a reference object, the method comprising the steps of:
- generating a plurality of images of the reference object from a plurality of angles;
- generating at least one processed image from at least one reference image of the plurality of images;
- generating a reference fingerprint for the reference object based on the at least one processed image;
- generating at least one candidate image of a candidate object;
- generating a candidate fingerprint for the candidate object based on the at least one candidate image;
- comparing the candidate fingerprint and the reference fingerprint to determine whether a correlation exists between the candidate fingerprint and the reference fingerprint; and
- generating an alert based on the comparison of the candidate fingerprint and the reference fingerprint, wherein the alert is indicative that the correlation between the candidate fingerprint and the reference fingerprint exists.

\* \* \* \* \*